(12) United States Patent
Buhrmaster et al.

(10) Patent No.: US 6,737,375 B2
(45) Date of Patent: May 18, 2004

(54) PHOSPHATE SEALING FRITS WITH IMPROVED $H_2O$ DURABILITY

(75) Inventors: Carol L. Buhrmaster, Corning, NY (US); Robert Morena, Lindley, NY (US); Kamjula P. Reddy, Corning, NY (US); Randall E. Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 150 days.

(21) Appl. No.: 09/810,979

(22) Filed: Mar. 16, 2001

(65) Prior Publication Data

US 2002/0128141 A1 Sep. 12, 2002

Related U.S. Application Data

(63) Continuation-in-part of application No. 09/747,045, filed on Dec. 21, 2000, now abandoned.

(51) Int. Cl.[7] .............................. C03C 3/19; C03C 3/17; C03C 3/16; C03C 8/08; C03C 8/00; C03C 8/02
(52) U.S. Cl. ........................ 501/47; 501/48; 501/45; 501/14; 501/21; 501/24
(58) Field of Search .............................. 501/14, 15, 16, 501/17, 21, 24, 45, 47, 48, 52, 79

(56) References Cited

U.S. PATENT DOCUMENTS

| | | | |
|---|---|---|---|
| 5,246,890 A | 9/1993 | Aitken et al. | |
| 5,281,560 A | 1/1994 | Francis et al. | |
| 5,510,301 A | * 4/1996 | Fink et al. | ............ 501/20 |
| 5,516,733 A | 5/1996 | Morena | |
| 6,309,989 B1 | * 10/2001 | Kikutani | ............ 501/15 |

FOREIGN PATENT DOCUMENTS

| | | | |
|---|---|---|---|
| JP | 09-175833 | * | 8/1997 |
| WO | WO 97/30949 | * | 8/1997 |

* cited by examiner

*Primary Examiner*—David Sample
*Assistant Examiner*—Elizabeth A Bolden
(74) *Attorney, Agent, or Firm*—Walter M. Douglas

(57) ABSTRACT

Glass frit compositions, calculated in mole percent on an oxide basis, consisting essentially of 24.5 to 29.0% $P_2O_5$; 1.0 to 5.0% $B_2O_3$; 1.0 to 2.0% $Al_2O_3$; and sufficient amounts of SnO and ZnO (51.5 to 66.5% SnO, and 5.0–12.0% ZnO), wherein the molar ratio of SnO:ZnO is in the range of about 5.0:1 to 12:1, and 0.0 to 2.0% $SiO_2$. The glass compositions exhibit, under NMR spectroscopic analysis of [11]B nuclei, a signal containing at least two peaks at a chemical shift in the range of approximately −18 to −25 ppm. The frit compositions exhibit long term stability, durability, and resistance to attack against moisture in high temperature and humidity conditions and are capable of attaching optical fiber Bragg gratings without the use of a hermetic chamber and the like. An optoelectronic device that employs a sealing material that comprises a frit made from the glass compositions.

22 Claims, 6 Drawing Sheets

$^{11}$B NMR Frequency $^{11}$B NMR Frequency

PHOSPHATE SEALING FRITS WITH IMPROVED $H_2O$ DURABILITY

CLAIM OF PRIORITY

This Application is a continuation-in-part to U.S. patent application Ser. No. 09/747,045, filed Dec. 21, 2000, in the names of Buhlrmaster et al., now abandoned the entire content of which is incorporated herein by reference, and claims benefit of priority thereto under 35 U.S.C. §120.

TECHNICAL FIELD OF INVENTION

The present invention relates generally to lead-free borophosphate glass compositions, and more particularly, to lead-free $Al_2O_2$ and $B_2O_3$ containing sub-pyrophosphate SnO—ZnO—$P_2O_5$ (SZP) sealing frit compositions suitable for bonding glass, glass-ceramic and ceramic materials, such as bonding optical waveguide fiber and fiber Bragg gratings to substrates.

BACKGROUND OF THE INVENTION

Bonding frits based on SnO—ZnO—$P_2O_5$ (SZP) sealing glasses are currently used for attaching optical waveguide fibers to negative expansion β-eucryptite glass-ceramic substrates to make athermal refractive index gratings or otherwise called "fiber Bragg gratings" or simply "gratings." Fiber Bragg gratings are well known, and are widely used in the area of optical fiber communication systems and the like. Bonding a fiber Bragg grating to a temperature compensating substrate, such as β-eucryptite forms an athermal fiber Bragg grating.

The unique feature of SZP based frits is their moderate degree of bonding to the silica fiber. These frits typically possess the advantage of forming only a relatively weak to modest bond with the optical fiber. A laser is used in attaching fibers to the β-eucryptite substrate. The laser heats a small amount of SZP-frit to the point of softening and a fiber is inserted. Pull-strength testing of laser-sealed gratings bonded with the standard SZP frits typically show strength values of 2.0–2.5 lbs. over a relatively wide range of laser output. Failure in pull-strength testing for gratings bonded with these SZP frits typically occurs when the fiber pulls out of the seal, which is indicative of weak interaction between fiber and frit. As a result, the fiber is not damaged or broken when subjected to the intense strains created by the typically large mismatch in coefficient of thermal expansion between the optical fiber (CTE≈$0 \times 10^{-7}$/° C.), and temperature compensation substrate (CTE≈$-70 \times 10^{-7}$/° C.). Other glass frit systems that have been investigated, such as PbO—ZnO—$B_2O_3$, PbO—$B_2O_3$, or mixed alkali-ZnO—$P_2O_5$ (RZP), all tend to result in fiber breakage after attachment.

Once a fiber Bragg grating has been bonded to a temperature compensating substrate, the fiber Bragg grating must be packaged with moisture getters in a hermetically sealed enclosure. The reason for doing this is primarily to protect the sealing frit from exposure to environments of high humidity and high temperature, which can affect the fiber-frit bond and lead ultimately to failure of the fiber Bragg grating by causing a center wavelength shift over the life of the grating. Historically, phosphate glasses are prone to degradation in aqueous environment. Although the sealing glass frits currently used have markedly better durability than other phosphate frits of higher $P_2O_5$ content, they still exhibit relatively poor durability to high moisture and heat. The process of hermetically sealing fiber Bragg gratings, however, adds significantly to the cost, complexity and duration of the process of manufacturing a fiber Bragg grating. Thus, if it were possible, to eliminate the need for hermeticity, one can achieve great financial savings, as well as reduce manufacture and production time of the fiber Bragg grating.

With this in mind, researchers have striven to develop alternative compositions for relatively low phosphate sealing glasses in hopes of combining the features of good durability and attachment at a relatively low softening temperature. For example U.S. Pat. No. 5,246,890 (Aitken et al.) teaches compositions for non-lead sealing glasses containing 25–50 mole percent $P_2O_5$, and SnO and ZnO in amounts such that the mole ratio of SnO:ZnO is in the range of 1:1 to 5:1. Optionally, the glasses may contain up to 5 mole percent $SiO_2$; up to 5 mole percent $Al_2O_3$; and up to 20 mole percent $B_2O_3$. These SZP glasses are particularly useful as sealing glass flits for joining component parts in cathode ray tubes. The sealing frit disclosed in Aitken et al. preferably contains 29–33 mole percent of $P_2O_5$. Furthermore, Aitken et al. teaches that incorporating smaller amounts of $P_2O_5$, that is less than 29 mole percent, results in a sealing glass that exhibits an erratic and non-reproducible flow behavior in sealing operations.

Another example, U.S. Pat. No. 5,516,733 (Morena) modifies the powdered SZP sealing glass frit disclosed in U.S. Pat. No. 5,246,890 (Aitken et al.) by adding an appreciable quantity of mill additives comprising alumina and optionally zircon. A phosphate crystal phase is thermally developed in a seal produced with this modified SZP sealing glass, resulting in a substantial change in the viscosity-temperature characteristics of the seal, such that the seal remains rigid when reheated as a bake-out step. The overall effect of the mill additives on the viscosity of a fusion seal finds particular application in uniting the faceplate and funnel members to form a cathode ray tube envelope.

In a third example, U.S. Pat. No. 5,281,560 (Francis et al.) teaches non-lead sealing glasses containing 25–50 mole % $P_2O_5$, 30–70% SnO, 0–15% ZnO, wherein the mole ratio of Sn:ZnO is greater than 5:1, and an effective amount up to about 25% total of at least one oxide in the indicated proportions selected from the group consisting of 0–25% $Li_2O$, 0–5% $Na_2O$, 0–5% $K_2O$, up to 20% $B_2O_3$, up to 5% $Al_2O_3$, up to 5% $SiO_2$, and up to 5% $WO_3$. These glasses are particularly useful as sealing glass frits in sealing material to join component parts in electrical and electronic devices.

Unlike the present invention, however, the sealing frits disclosed in Francis et al.—like the sealing frit disclosed in Aitken et al.—preferably contain 29–33 mole % $P_2O_5$. Moreover, again like in Aitken et al., Francis et al. specifically teach that lower amounts of $P_2O_5$ (less than 29 mole percent) will result in a sealing glass exhibiting an erratic and non-reproducible flow behavior in sealing operations. In their more preferred embodiment, Francis et al. disclose that $P_2O_5$, should be at or near the pyrophosphate stoichiometry, which is about 33%, as reflected in their examples.

Furthermore, persons versed in the art can recognize that a sealing frit, having the desired properties, can not be made from the compositions disclosed by Francis et al. For a sealing frit to function as we have envisioned, any significant amounts of alkali will induce crystallization by acting as an oxidizing agent to the SnO present.

Hence, the search for a sealing frit that has improved durability from exposure to high humidity and high temperature environments continues. Therefore, a great need exists for frit compositions that exhibit long term stability, durability, and resistance to attack against moisture and high humidity conditions, and to which fiber gratings can be attached without the use of a hermetic chamber.

SUMMARY OF THE INVENTION

As a consequence of the need for more durable glass compositions, a general aspect of this invention is directed to providing lead-free, $Al_2O_2$ and $B_2O_3$-containing sub-pyrophosphate $SnO$—$ZnO$—$P_2O_5$ (SZP) glass compositions suitable for use as sealing frits for bonding glass, glass-ceramic or ceramic substrates. More particularly, another aspect of the present invention pertains to a glass composition suitable for bonding optical waveguide fiber to substrates. The "sub-pyrophosphate" category encompasses glass compositions that contain $P_2O_5$ in amounts approximately less than 32% or 33%, preferably even less than 29.5%, in terms of mole percent. The glasses of the present invention are lead-free compositions, as calculated in mole percent on an oxide basis, containing 24.5 to 29.0% $P_2O_5$, 1.0 to 5.0% $B_2O_3$, 1.0 to 2.0% $Al_2O_3$, with SnO and ZnO in amounts such that the mole ratio of SnO:ZnO is in the range from about 5.0:1 to 12:1, (approximately 51.5 to 66.5% SnO, 5.0 to 12.0% ZnO), and 0.0 to 2.0% $SiO_2$. Additionally, the sub-pyrophosphate glass compositions exhibit, under NMR spectroscopic analysis of $^{11}B$ nuclei, a signal profile containing at least two peaks at a chemical shift in the range of approximately −18 to −25 ppm relative to aqueous boric acid. The SZP base glasses resulting from these compositions show markedly increased aqueous durability. Gratings attached with sealing frits made from such base glass compositions have shown excellent long term stability in damp or humid, hot environments, and may not require hermetic packaging during their service life.

Additional features and advantages of the invention will be set forth in the detailed description that follows. It is to be understood that both the foregoing general discussion and the following detailed description and examples provided herein are merely exemplary of the invention, and are intended to provide an overview or framework for understanding the nature and character of the invention as it is claimed.

DETAILED DESCRIPTION OF THE INVENTION

Figure 1:
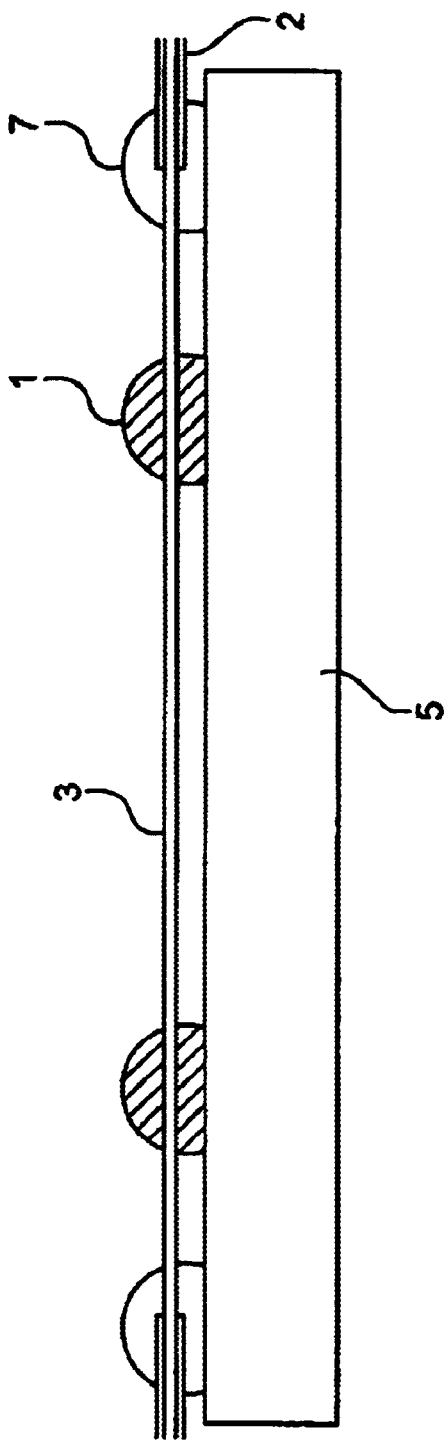
FIG. 1. A fiber Bragg grating device showing flit attachments.

One method of athermalizing a fiber Bragg grating is to secure the grating to a temperature compensating substrate, as shown in FIG. 1. A tin-zinc-phosphate (SZP) glass frit 1 is used currently to attach a piece of partially stripped, optical fiber 3 to a β-eucryptite glass ceramic substrate 5 to achieve athermalization. A dollop of epoxy 7 is used to attach each end of the cladded fiber z to the substrate. This grating is then packaged in a hermetically sealed enclosure, primarily to prevent a shift in center wavelength and to protect the frit from exposure to moisture, which can ultimately cause complete failure of the device. As currently practiced, the hermetic package, together with moister getters, add substantial manufacturing cost to this product. Thus, a significant cost and process advantage can be achieved if the need for hermeticity were eliminated.

A shortcoming of the current SZP frit blends is their low durability to water. Gratings made with conventional flits show unacceptably high shifts in center wavelength when subjected to damp-heat conditions (85° C., 85% relative humidity). The center wavelength shifts of non-hermetically packaged gratings made with standard flits exceed the permissible maximum for most grating applications of ±0.05 nm within 100–200 hours. A fiber Bragg grating must provide a stable center wavelength for optical stability. Since the device is designed to separate specific wavelengths, any significant deviation would affect optical performance.

To eliminate the need for a hermetic package and other problems, a better glass frit composition needs to be developed. Such a glass frit will need to be both durable in high temperature and humid environments and provide sufficient center wavelength control and thermal stability throughout the life of the grating without hermetically sealing the device. A successful frit composition must have a number of major attributes. The frit must be moisture resistant, as measured in relation to any shift or change to the center wavelength of the fiber Bragg grating after exposure to damp heat testing. The frit needs to provide good strength in the frit-fiber bond and good adaptation to photo-elastic stress or transient stress. These properties are related to possessing an adequate operating window for laser attachment, measured by melting characteristics such as appearance, pull strength, and damage to optical fiber, versus input voltage. These attributes can be counter indicated, thus developing a sealing frit for fiber Bragg gratings has often meant finding the optimum balance.

To understand the relationship between the composition of the flit and its durability, a study was undertaken. The results of the study can be summarized in reference to four main points. Namely, first, water durability of Sn—Zn—P glasses depends on the level of $P_2O_5$ and $B_2O_3$ in the glass. For compositions in a matrix experiment, good water durability could be obtained by either lowering $P_2O_5$ or increasing $B_2O_3$, or both. Second, the firing temperature range for optimal bond strengths between frit and fiber is generally smaller for durable flits as compared to the currently used production frit composition. Third, the firing temperature has a significant effect on the measured bond strengths. Boron appears to play a key role in the interfacial bond between the frit and fiber. Fourth, photoelastic measurements using asymmetric sandwich seals indicated that the composition of a filler can have significant effect on the magnitude of transient stresses in silica.

Environmental durability against moisture in phosphate glasses is a function of many variables, but correlates most immediately with the $P_2O_5$ level. The amount of $P_2O_5$ controls aqueous durability in phosphate glasses. To illustrate this principle, Table 1 lists three compositions for glass frits. Table 1 also lists their relative durability to immersion in 90° C. de-ionized water, as measured by their change in weight ($mg/cm^2$). Samples of the three compositions were immersed for 24, 48, 72 and 96 hours, with all measurements performed on the same test specimen of each composition, respectively. Experimental comparison shows that a decrease in the $P_2O_5$ level from 32 mole % (pyrophosphate) for Comparative Example 2, to 28.5 mole % (sub-pyrophosphate) for Comparative Example 1, is sufficient to improve aqueous durability by more than one order of magnitude. Comparative Example 1 is a SZP-sealing frit that had been used for laser attaching gratings. (Note that the aqueous durability on the Pb-based frit, Comparative Example 3, is intermediate between the two kinds of SZP frits.) Although frits like Comparative Example 3, used traditionally for sealing cathode ray tubes (CRTs), have been considered to have excellent aqueous durability, the better durability of Comparative Example 1, when compared to that of Comparative Example 3, indicates suggests a much more demanding durability requirement for a flit used in grating attachment than for a CRT-sealing flit.) Even though, the composition of Comparative Example 1 (in mole percent, 28.5% $P_2O_5$; 1.0% $B_2O_3$; 63.6% SnO; 6.4% ZnO; and 0.5% $Al_2O_3$) places it in the "sub-pyrophosphate" category, this glass still exhibits unacceptable levels of aqueous durability in a non-hermetically sealed device.

To address the aqueous durability problem, we considered several possible compositional modifications of Comparative Example 1 to improve its durability. One way to improve aqueous durability was to lower the $P_2O_5$ content. Previously, only small reductions were possible, however, since reducing the $P_2O_5$ content any further below roughly 28.5% would jeopardize the glass stability in the SZP system. Our inventive compositions have managed to overcome this limitation. Our modifications in part have been able to reduce the $P_2O_5$ content to lower levels, to as much as 24.5 mole %—although for practical purposes to 25.0 or 25.5 mole % is more preferred—at which a glass could still form a stable frit, that is, a fine powder (20–40 $\mu$m) which exhibits viscous flow without premature crystallization.

To improve stability, small amounts of a second glass-forming oxide, $B_2O_3$, were added, substituting for SnO and ZnO. The addition of $B_2O_3$ to phosphate glasses creates groups that act as strong three-dimensional anchors on the structure, as evidenced by increases in softening and annealing point, and decreases in thermal expansion. Although boron groups slightly increase the softening and annealing temperatures, the increase is minimal and within the tolerable range. In fact the increase is only 20° C., well within sealing temperature allowances. More importantly, as will be discussed later in greater detail, the presence of $BPO_4$ and other boron groups substantially increase the aqueous durability of our inventive glass compositions. The $Al_2O_3$ level was increased slightly, although not enough to cause precipitation of an aluminum phosphate compound (possibly $AlPO_4$). Small amounts of $SiO_2$ could be tolerated, but preferably this compound should be kept to a minimum. In fact, concerns about $SiO_2$ causing a large increase in the $T_g$ in SZP glasses, lead us to give higher priority to $B_2O_3$ and $Al_2O_3$ substitutions in the composition study.

Additionally from our studies, it appears that the closer that one approaches a pyrophosphate composition with regard to $P_2O_5$ levels, the concentration of isolated, tetrahedral $PO_4$ decreases in the glass, in favor of connecting with other phosphate groups to form chains or cyclical structures. Consequentially, $PO_4$ groups become less available to form $BPO_4$. This phenomenon also suggests that there may be an upper limit to the level of $P_2O_5$ at which increasing levels of $B_2O_3$ will cease to work to increase durability and stability. This limit may be at approximately 29 mole % $P_2O_5$.

The glass frit compositions of the present invention comprise 24.5 to 29.0% $P_2O_5$, 1.0 to 5.0% $B_2O_3$, 1.0 to 2.0% $Al_2O_3$, with SnO and ZnO in amounts such that the molar ratio of SnO:ZnO is in the range from about 5:1 to 10:1, (approximately 51.5 to 66.5% SnO, 5.0 to 12.0% ZnO), and 0.0 to 2.0% $SiO_2$, as calculated in mole percent on an oxide basis. Preferred embodiments of the inventive glass compositions, as calculated in mole percent on an oxide basis, consist essentially of 25.0 to 28.5% $P_2O_5$, 1.3 to 5.0% $B_2O_3$, 1.0 to 2.0%, $Al_2O_3$, 52.0 to 65.0% SnO, and 5–12% ZnO, wherein the molar ratio of SnO:ZnO is approximately 5.0:1 to 11.7:1, and 0.0–1.0% $SiO_2$. Other more preferred embodiments, in mole percent, can contain 25.5 to 28.3% $P_2O_5$, 1.3 to 3.0% $B_2O_3$, 1.0 to 2.0% $Al_2O_3$, while maintaining the amounts of SnO and ZnO such that the molar ratio of SnO:ZnO is approximately 5.0:1 to 10.5:1, and 0.0–0.5% $SiO_2$. Alternatively, the compositions, in mole percent, can contain 26.5 to 28.0% $P_2O_5$, 2.0 to 3.0% $B_2O_3$, 1.0 to 2.0% $Al_2O_3$, while keeping the SnO:ZnO molar ratio within the range of about 5:1 to 10:1. The amount of $P_2O_5$ can also range from 25.0 to 26.5 mole %. These frit compositions have comparable coefficients of thermal expansion (CTE) as the SZP frits currently used in fiber Bragg gratings. Specifically, in the temperature range of 25–300° C., frits made with a filler exhibit a CTE of approximately $-10 \times 10^{-7}/°$ C. The softening temperatures of the glasses range from about 345° C. to approximately 380° C., and are generally higher for glasses containing more $B_2O_3$.

EXAMPLES

Figure 2:
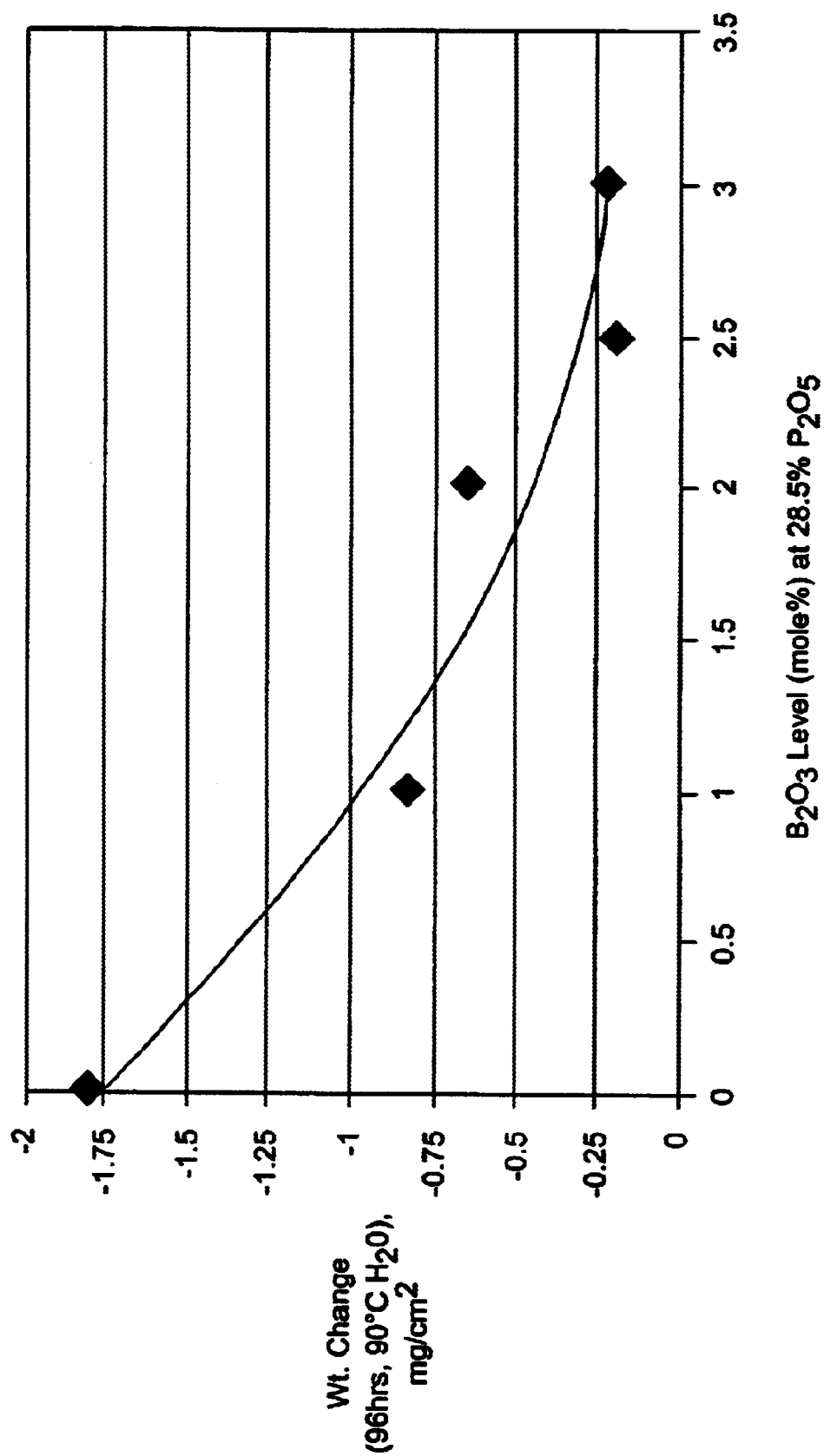
FIG. 2. Aqueous durability of SZP frits as a function of $B_2O_3$ content of the composition.

The invention will be further clarified by reference to specimens in the several accompanying Tables. Table 2 shows several compositions for a series of glasses and their respective chemical durability data. To a basic SZP-glass composition, Comparative Example 4, which contains 28.5% $P_2O_5$, $B_2O_3$ was added as a replacement for SnO+ZnO, with the SnO/ZnO ratio held at approximately 10:1 to 12:1. $B_2O_3$ levels of 2.0, 2.5 and 3.0 mole % were examined. As a general observation, for the glass examples, addition of even a small amount of $B_2O_3$ (1 mole %) can result in a lowering of the aqueous corrosion by half over long periods of exposure. In FIG. 2, the aqueous durability results for Comparative Examples 1 and 4, and Examples 1–3 are plotted as a function of the $B_2O_3$ content. Even though, all of these glasses contain approximately 28.5 mole % $P_2O_5$, one can observe a significant increase in durability with increasing $B_2O_3$ content. Durability improves in a continuous, exponential fashion with the addition of $B_2O_3$ to the basic phosphate glass composition. Significant improvement became noticeable at about 2 mole % $B_2O_3$.

Aqueous durability tests were performed on samples. Composition of Example in Table 2, exhibits superior aqueous durability to the current conventional sub-pyrophosphate (Comparative Example 1) or pyrophosphate SZP frits (Comparative Example 2), or even vitreous PbO—ZnO—$B_2O_3$ frits (Comparative Example 3) in Table 1. Hence, Example 5 is a preferred composition of the inventive frit. Example 5 is a glass that consists of both lowered $P_2O_5$ level (26.5 mole %) and increased $B_2O_3$ content (2.8 mole %). The data indicates that this glass exhibits better durability than the other glasses in the series having 28.5 mole % $P_2O_5$ listed. This indicates that both lower $P_2O_5$ levels, and higher $B_2O_3$ levels are required for best aqueous durability. Also studied was the effect of $SiO_2$ partially replacing $B_2O_3$, at levels of 0.5, 1.0, and 1.5 mole %. Unfortunately, durability decreased with increasing levels of $SiO_2$.

Table 3, provides additional examples of inventive glass compositions, which satisfy compositional ranges for the present invention, along with a listing of additional comparative examples. Similar to the examples in Table 2, in each of the inventive compositional examples in Table 3, $B_2O_3$ was added by replacement of SnO and ZnO, with the SnO/ZnO ratio at approximately 5.0:1 to 10.0:1 in each respective glass. Again, aqueous durability improves with increasing $B_2O_3$ levels, although experiments suggest that the degree of improvement tends to level-off beginning at $B_2O_3$ contents higher than 3.5 mole %.

Although a few of the comparative examples appear to have $P_2O_5$ levels that are within the compositional ranges that we have specified, these comparative examples exhibited less than satisfactory performance when subjected to aqueous durability testing over prolonged periods. These observations suggest that the inventive glass compositions, although not easily distinguishable, would not be obvious by merely observing the composition ranges alone.

For instance, listed in Table 7 are three different SZP-frits that have been evaluated as attachment frits for fiber Bragg gratings. The three frits are relatively close in composition, with $P_2O_5$ content ranging from 26.5 to 28.5%, and $B_2O_3$ level content varying from 1.0 to 2.8%. But, the frits differ widely with respect to water durability. Examples 5 and 20 are much more durable than Comparative Example 1.

TABLE 7

| Oxide (mole %) | Comp. Ex. 1 | Ex. 20 | Ex. 5 |
| --- | --- | --- | --- |
| $P_2O_5$ | 28.5 | 26.5 | 26.5 |
| $B_2O_3$ | 1.0 | 2.5 | 2.8 |
| ZnO | 6.4 | 6.3 | 5.6 |
| SnO | 63.6 | 63.2 | 63.7 |
| $Al_2O_3$ | 0.5 | 1.4 | 1.5 |
| Visual character of glass | clear | opal | opal |
| Softening point | 325° C. | 335° C. | 340° C. |
| Aqueous durability (90° C. de-ionized $H_2O$) | poor | excellent | excellent |

Figure 4:
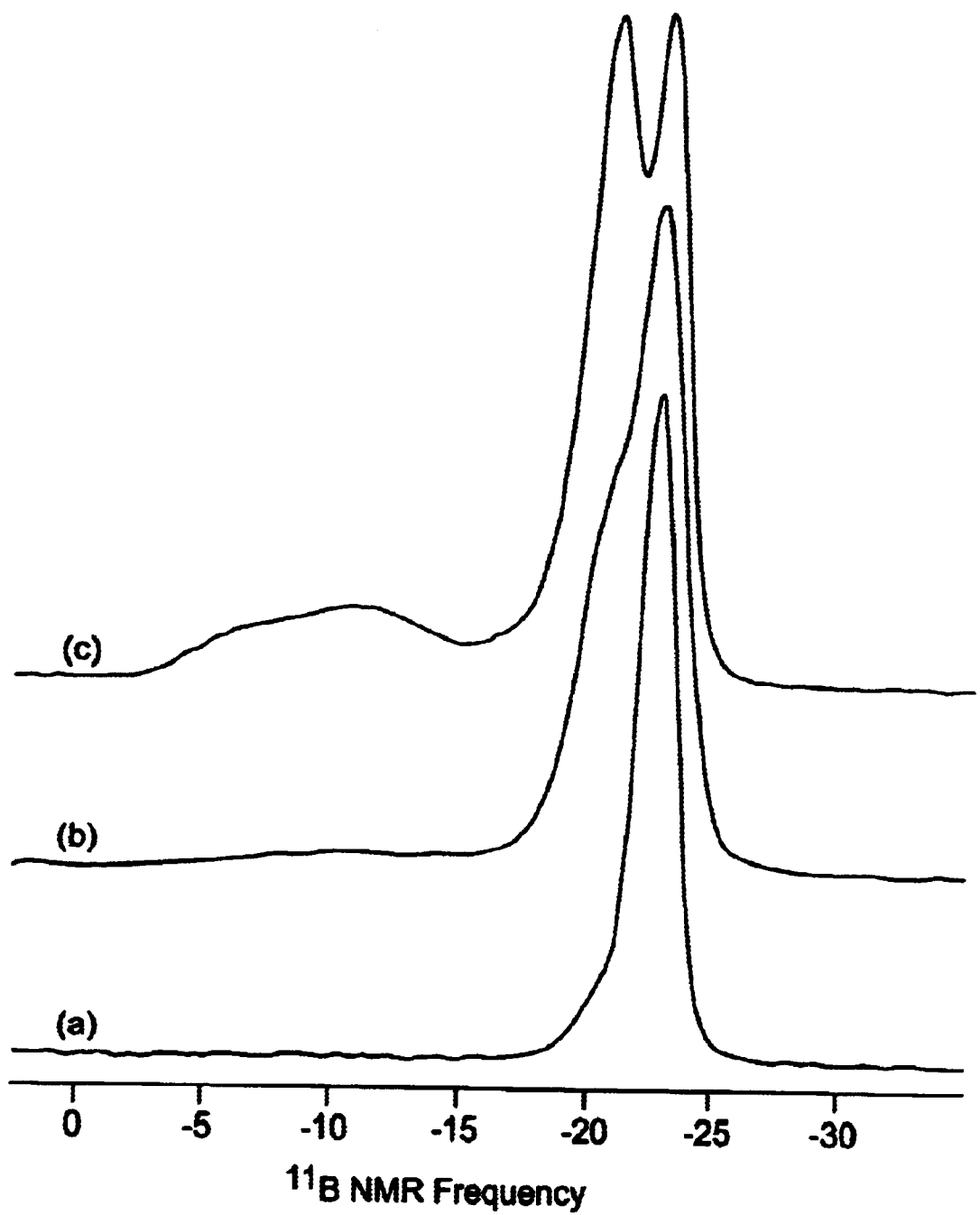
FIG. 4. $^{11}B$ nuclei MAS NMR spectra, measured at 11.7 T, for a series of SZP glasses, exhibiting at least two signal-peaks in a chemical shift range of −18 to −25 ppm.
Figure 5A:
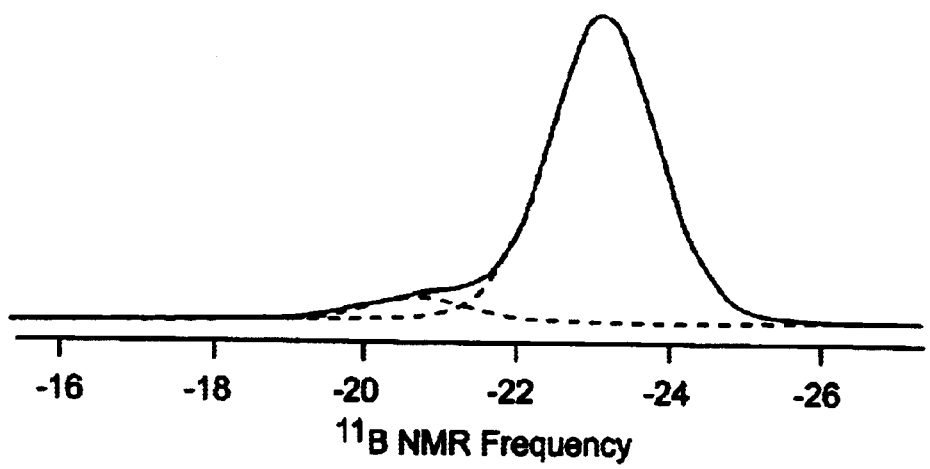
FIG. 5. $^{11}B$ nuclei MAS NMR spectra for five different glass compositions, shown in comparison and illustrating a signal-peak at a chemical shift of −20 ppm and a peak at about −24 ppm, indicating the presence of $BPO_4$. (Dashed-lines denote fits to experimental data.)
Figure 5B:
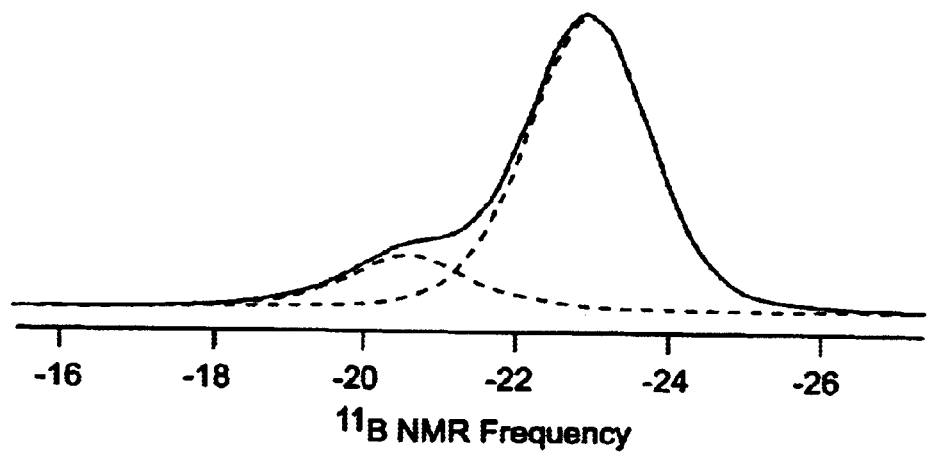
Figure 5C:
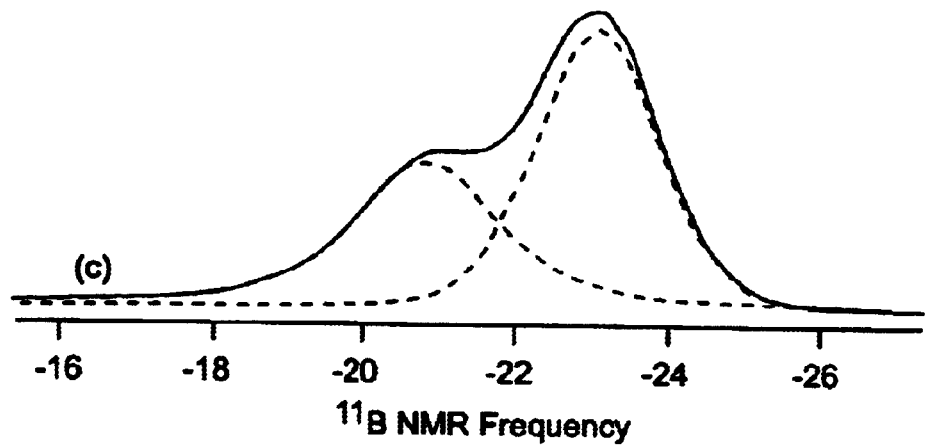
Figure 5D:
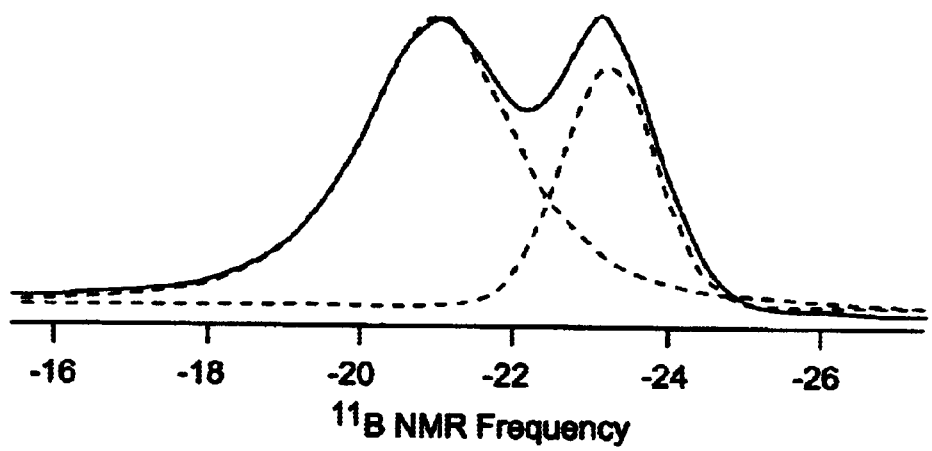
Figure 5E:
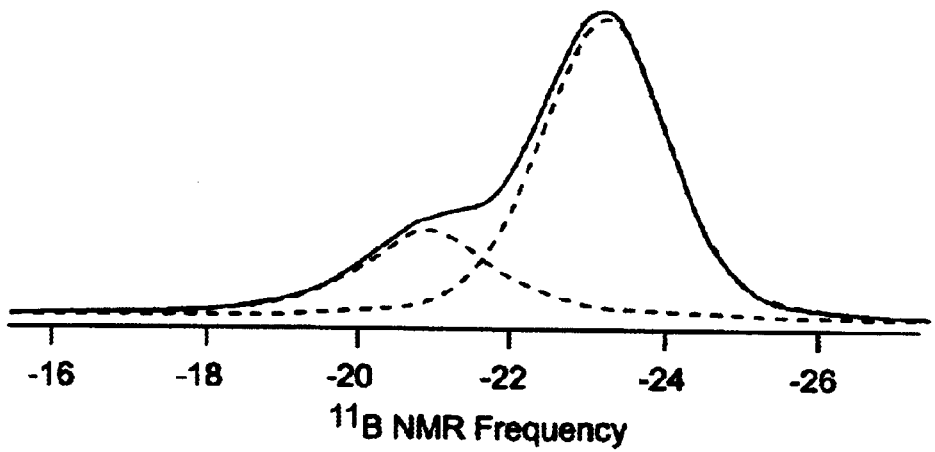

NMR techniques have served as a powerful tool to interpret structural differences between the three seemingly similar frits. NMR data from analysis of the three compositional examples suggest that structural differences are responsible for the performance differences, shown above. Illustrated in accompanying FIG. 4, are solid state NMR data for the $^{11}B$ nucleus in each of the three glass: (a) Comparative Example 1, (b) Example 20, and (c) Example 5. The NMR frequencies have been referenced to an external aqueous boric acid solution. The NMR spectra are characterized by showing one or two relatively sharp features in the chemical shift range of −15 to −30 ppm. This pattern may be ascribed, on the basis of published literature studies, to the presence of tetrahedral boron (i.e. $BO_4$) groups. Note that for (c), Example 5, this signal is split into two distinct peaks, with a resonance at approximately −20 ppm and one at approximately −23 ppm. The presence of two types of tetrahedral boron ($BO_4$ and $BPO_4$) is especially significant.

TABLE 8

| GLASS | Trigonal Boron (−10) | $BPO_4$ groups (−20) | $BO_4$ groups (−23) |
| --- | --- | --- | --- |
| (c) Example 5 | 13% | 60% | 27% |
| (b) Example 20 | 7.2% | 39% | 53.8% |
| (a) Comp. Ex. 1 | 1% | 7.9% | 91.1% |

Note that there is also a second feature that appears in the NMR data for a couple of the glasses: a small peak centered at approximately −10 ppm. This peak corresponds to trigonal boron, i.e., $BO_3$ groups in the glass. Example 5 contains the highest fraction of three-coordinated boron of the three glasses. Comparative Example 1 contains virtually no $BO_3$ groups, while Example 20 is intermediate with respect to the concentration of $BO_3$ groups.

The NMR data does much to provide a structural rationale for the differences observed in the behavior of the three seemingly similar glasses. Phosphorus complexed with boron makes the ordinarily easily-soluble phosphorus cation more difficult to remove, and results in the much better aqueous durability of Examples 5 and 20 relative to Comparative Example 1.

FIG. 5 shows in detail the NMR spectra of five different glass compositions: (a) Composition Example 1, (b) Example 18, (c) Example 20, (d) Example 5, (e) Example 19. The plot contains data for two series of glasses with two different $P_2O_5$ contents (28.5 mole %: (a), (b), (e), and 26.5 mole %: (c), (d)), where the fraction of $BPO_4$ is consistent within each series of $P_2O_5$ compositions. This figure shows only the tetrahedral boron peaks, with deconvolution of the $BPO_4$ and $BO_4$ units. The plot is in ascending order based on $B_2O_3$ content of the glasses, starting with (a) Composition 1, and ending with (e) Example 19.

Aqueous durability testing was performed on fired flow-buttons prepared from powders of each of the glasses listed in Tables 1, 2, and 4. The flow-buttons were initially hand-pressed cylinders (approximately 3.5 cm tall×1.25 cm diameter) made from powders with a mean particle size of 20–40 μm. The flow-buttons were fired at approximately 380–410° C. on platinum foil and then removed for the tests. The test consisted of immersing the specimens in the test solution, and then assessing durability on the basis of weight change (normalized to surface area), and appearance. The glass specimens for durability testing for this series were core-drilled (diameter 16 mm and thickness≈2.8 mm) from annealed patties, and the two sides of the specimens were polished using cerium oxide. The glass specimens were placed in a plastic (nalgene) bottle containing 100 ml of de-ionized water. The bottles were placed in an oven set at 90° C. to heat to temperature. The weight of specimens were measured after 0, 1, 5, and 13 days by using a precision balance. The water was analyzed by ICP to determine the chemical elements that were leached from the glass.

Table 4 provides a list of the weight changes observed after different times in the 90° C. water. Note that the samples were returned to the original water after each measuring of the weight. In addition to weight change data, the softening temperatures (parallel plate viscosity measurement), relative light transmission through the glass, and ranking of the physical appearance of samples after the durability test are also given in Table 4. Arranged on a scale of 1 to 6, both the inventive examples and the comparative examples were ranked according to their performance, wherein the samples with the best durability were given a rank of 6, and the worst were given a rank of 1. The concentration of the elements leached into the water in parts per billion is given in Table 5.

From the water durability data, in Tables 4 and 5, we can observe several favorable properties of the inventive frit compositions. In Table 4, the best examples of the present invention ranked at least either a 5 or 6. All the compositions with 25.5 mole % $P_2O_5$ exhibited good durability in hot water irrespective of the levels of other elements. Using as a reference the durability data of currently available frit compositions, our inventive glasses with weight loss less than 2–3 mg/cm$^2$ (preferably less than 1 or 0.8 mg/cm$^2$) after 13 days in 90° C. water can be considered to have improved durability. In clear glass samples, a white reaction layer was observed on the surface of the specimen. Immersed in 90° C. de-ionized water, specimens tend to form a white precipitate within 48 hours, and to produce a milky appearance in the supernatant. When the amount of $P_2O_5$ is greater than 25.5 mole %, the durability of the glass could be improved by increasing the levels of $B_2O_3$ and $Al_2O_3$. In Table 5, elemental analysis of the immersion water indicates that all the elements present in the glass are being leached out in approximate proportion to their concentration levels in the glass. The weight change measurements and the appearance of the surface of glass specimens after the durability test, tend to agree.

Measurements of pH indicate that the dissolution of the glass in water makes the aqueous solution more acidic. Glasses with poor durability tend to dissolve much faster due to increasing acidity of the solution over time. For glass samples with good durability, the weight changes are less than 1.2 mg/cm$^2$. Because of the small weight changes, it becomes difficult to differentiate among these samples that have good durability. To establish the variability in durability test results, multiple samples from different melts were evaluated. Table 6 shows the weight change data for five different compositions.

As noted from Table 2, we observed an improvement in both bench durability tests with increasing $B_2O_3$ additions. Nonetheless, the performance of a fiber Bragg grating device we found to depend on the dimensional stability of the substrate durability of the SZP-frit in moist environments and the stability of interfacial bounds at fiber/frit/substrate interfaces. While it was observed that increasing the boron content does improve the durability of these glasses, the effect of other elements on glass durability is not well understood. Therefore, it was decided to conduct a statistically designed matrix experiment to establish the relationships between the glass durability and its composition.

Figure 3:
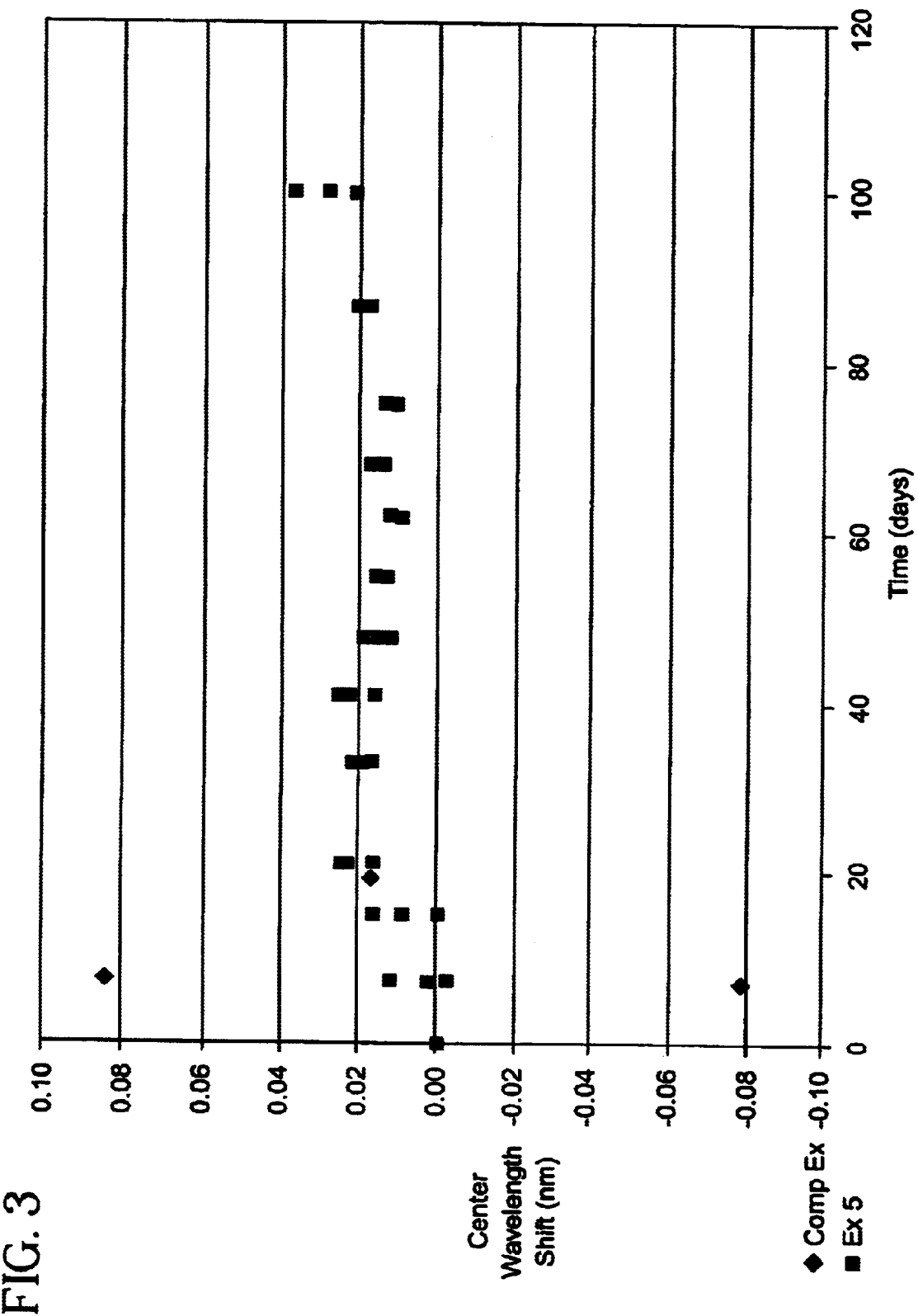
FIG. 3. Comparative data of center wavelength stability in damp heat environment for gratings attached with two different SZP glass flit compositions.

A relationship between the composition and its performance in fiber Bragg devices was established in 85° C./85% relative humidity damp heat tests. Exposure of conventional SZP frit blends to damp heat conditions causes a change in appearance within a few days of exposure marked by a color shift from the initial deep blue to whitish-blue. To develop a better empirical understanding, a few fiber Bragg devices were made with three compositions. Table 9 illustrates center wavelength shifts for three frit Blends A, B, C, that have been prepared from Examples 6, 8, and 5, respectively, and a filler. There is no significant difference in the durability of these three compositions except that they have different amounts of boron. The center wavelength shifts, however, are markedly different for these compositions, and appear to correlate with the boron level. Compositions that have lower levels of $B_2O_3$ (1–2%) appeared to have negative center wavelength shifts, indicating slippage at the frit-fiber interface and suggesting that boron may have a key role in the frit-fiber bond. The effect of a more moisture durable SZP attachment frit on gratings performance may be seen in FIG. 3, which shows the center wavelength shift for gratings made with attachment frit based on existing SZP glass composition, Comparative Example 1, and Example 5 of the inventive glass frit compositions. Center wavelength stability measurements were made following storage of the grating in damp heat (85° C./85% relative humidity) chambers for the indicated time periods, in days. Note that the gratings attached with the existing standard SZP flit blend shifts to outside of the parameters of favored specification allowable drift, to ±0.08 nm, within 5 to 10 days of damp heat exposure. Current or evolving gratings have specifications that require narrower tolerances for center wavelength stability. The specification parameter for most grating applications is that center wavelength shift should not exceed ±0.05 nm. The inventive frit composition (Example 5) deviates much less than the standard frit (Comparative Example 1). In fact center wavelength drift remained within specification parameters even after 100 days of exposure.

As an industrial material, the desired properties of the inventive sealing glass frit as deployed in a fiber Bragg grating must be reproducible. To check reproducibility, we made another set of samples. The substrates were similar to those used in the prior experiment. The results were consistent with the boron hypothesis.

Residual stresses arise when the thermal expansion between the fiber, frit, and substrate are mismatched. The inventive phosphate glass compositions have a coefficient of thermal expansion (CTE) of about 90–110×10$^{-7}$/° C. for samples that are made without fillers. To make the inventive glass compositions suitable for sealing a variety of low or negative expansion substrates, in practical application, the glass frits require incorporating fillers to minimize residual stresses that may arise. When a filler is used, the CTE of the inventive sealing frits can be reduced to zero or negative expansion. More particularly, frits have a CTE of approximately $-10 \times 10^{-7}$/° C. to $10 \times 10 \times^{-7}$/° C. when a filler is added.

Fillers, such as ($[Co, Mg]_2P_2O_7$), undergo a volume increase during cooling because of a phase transformation. By adjusting the ratio of Co/Mg, the temperature at which the filler transforms can be controlled. It is thus possible to minimize transient stresses during cooling by varying the volume fraction and composition of the fillers. To simulate a stress situation similar to that found in a fiber Bragg device, an asymmetric sandwich seal was used for measuring the transient stresses. The frit paste was stenciled onto a β-eucryptate substrate and a fused silica bar of approximately the same size as the substrate was placed on top. The sample was fired to about 500° C. We measured the stresses during cooling.

Experimental results indicated that a composition of frit could accommodate about half the mismatch strain between the β-eucryptite substrate and silica. Stresses start building during cool down at 325° C. and when the sample reaches 200° C., the silica bar develops cracks even before the inversion of the filler. To demonstrate the effect of fillers, another sample with fillers was examined. A mixed-filler specimen exhibited similar behavior to a single filler specimen, except that the sample assembly could be cooled to room temperature without failure of the silica bar. Photoelastic stress measurements seem to suggest that compositions with mixed fillers are better in minimizing the transient stresses.

Although the present invention has been fully described by way of examples, it will be apparent to those skilled in the art that various modifications and variations can be made to the present glass compositions without departing from the spirit and scope of the invention. Therefore, unless such changes and modifications otherwise depart from the scope of the present invention, they should be construed as included herein.

TABLE 1

Composition and Durability Comparison for Three Prior Art Glass Frits

| Category | Comparative. Ex. 1 SZP (sub-pyro-phosphate) | Comparative. Ex. 2 SZP (pyro-phosphate) | Comparative Ex. 3 Pb-based CRT |
|---|---|---|---|
| Composition (mole %) | | | |
| PbO | — | — | 50.6 |
| $P_2O_5$ | 28.5 | 32.0 | — |
| $B_2O_3$ | 1.0 | 1.8 | 18.1 |
| ZnO | 6.4 | 3.1 | 24.0 |
| SnO | 63.6 | 61.9 | — |
| BaO | — | — | 1.9 |
| $SiO_2$ | — | — | 5.5 |
| $Al_2O_3$ | 0.5 | 0.7 | — |
| $WO_3$ | — | 0.5 | — |
| Molar Ratio: SnO/ZnO | 9.9 | 19.97 | — |
| Aqueous durability (immersion in 90° D.I. $H_2O$, Weight Change as mg/cm²) | | | |
| After 24 hrs. | −0.36 | −0.96 | −1.04 |
| After 48 hrs. | −0.52 | −8.67 | −2.17 |
| After 72 hrs. | −0.61 | −13.6 | −4.67 |
| After 96 hrs. | −0.83 | −32.0 | −6.06 |

TABLE 2

$B_2O_3$ addition to a $P_2O_5$ Glass

| | Comp. Ex. 4 | Ex. 1 | Ex. 2 | Ex. 3 | Ex. 4 | Ex. 5 |
|---|---|---|---|---|---|---|
| Composition (mole %) | | | | | | |
| $P_2O_5$ | 28.5 | 28.5 | 28.5 | 28.5 | 28.5 | 26.5 |
| $B_2O_3$ | — | 2.0 | 2.5 | 3.0 | 2.0 | 2.8 |
| $SiO_2$ | — | — | — | — | 1.0 | — |
| ZnO | 6.3 | 6.2 | 6.1 | 6.0 | 6.0 | 5.6 |
| SnO | 63.7 | 61.8 | 61.4 | 61.0 | 61.0 | 65.3 |
| $Al_2O_3$ | 1.5 | 1.5 | 1.5 | 1.5 | 1.5 | 1.1 |
| Molar Ratio: SnO/ZnO | 10.1 | 9.97 | 10.1 | 10.2 | 10.2 | 11.7 |
| Aqueous durability (immersion in 90° C. D.I. $H_2O$, Weight Change as mg/cm²) | | | | | | |
| After 24 hrs. | −0.03 | −0.06 | −0.08 | −0.07 | −0.06 | −0.05 |
| After 48 hrs. | −0.23 | −0.20 | −0.12 | −0.12 | −0.49 | −0.09 |
| After 72 hrs. | −0.81 | −.034 | −0.18 | −0.16 | −2.57 | not taken |
| After 96 hrs. | −1.79 | −0.65 | −0.19 | −0.22 | −5.39 | −0.12 |

TABLE 3

| Examples of Glass-frit | $P_2O_5$ | $B_2O_3$ | $Al_2O_3$ | ZnO | SnO | Sn/Zn Ratio |
|---|---|---|---|---|---|---|
| Compositions | | | | | | |
| 6 | 25.0 | 1.0 | 2.0 | 11.1 | 60.9 | 5.49 |
| 7 | 25.5 | 2 | 1 | 11.92 | 59.58 | 5.0 |
| 8 | 25.5 | 2 | 2 | 10.92 | 59.58 | 5.46 |
| 9 | 25.5 | 3.5 | 1.5 | 10.75 | 58.75 | 5.47 |
| 10 | 25.5 | 5 | 1 | 8.92 | 59.58 | 6.68 |
| 11 | 25.5 | 5 | 1.5 | 8.42 | 59.58 | 7.12 |
| 12 | 25.5 | 5 | 2 | 11.25 | 56.25 | 5.0 |
| 13 | 25.5 | 5 | 1 | 8.92 | 59.58 | 6.68 |
| 14 | 26.69 | 4.37 | 1.27 | 10.37 | 57.3 | 5.53 |
| 15 | 26.69 | 2.87 | 1.27 | 10.62 | 58.55 | 5.51 |
| 16 | 27.87 | 3.75 | 1.54 | 9.32 | 57.52 | 6.17 |
| 16a | 27.87 | 3.75 | 1.54 | 9.32 | 57.52 | 6.17 |
| 17 | 28 | 3.83 | 2 | 9.11 | 57.07 | 6.26 |
| 18 | 28.5 | 1.5 | 1.5 | 6.1 | 62.4 | 10.23 |
| 19 | 28.5 | 3.0 | 1.5 | 6.0 | 61.0 | 10.17 |
| 20 | 26.5 | 2.5 | 1.5 | 6.3 | 63.2 | 10.03 |
| COMPARATIVE EXAMPLES | | | | | | |
| Comp. Ex. 5 | 29.5 | 2 | 1 | 11.25 | 56.25 | 5 |
| Comp. Ex. 6 | 29.5 | 2 | 1 | 9.59 | 57.92 | 6.04 |
| Comp. Ex. 7 | 29.5 | 3.5 | 1 | 11 | 55 | 5 |
| Comp. Ex. 8 | 29.5 | 5 | 1 | 10.75 | 53.75 | 5 |
| Comp. Ex. 9 | 29.5 | 5 | 1 | 5.86 | 58.64 | 10.00 |
| Comp. Ex. 10 | 29.5 | 5 | 1.5 | 10.67 | 53.34 | 5 |
| Comp. Ex. 11 | 29.5 | 5 | 2 | 10.58 | 52.92 | 5 |
| Comp. Ex. 12 | 29.5 | 2 | 2 | 11.08 | 55.42 | 5.0 |
| Comp. Ex. 13 | 29.5 | 2 | 2 | 9 | 57.5 | 6.39 |
| Comp. Ex. 14 | 29.5 | 2.96 | 2 | 5.96 | 59.58 | 10 |
| Comp. Ex. 15 | 29.5 | 3.5 | 2 | 10.83 | 54.17 | 5.0 |
| Comp. Ex. 16 | 29.5 | 3.74 | 1.58 | 8.6 | 56.57 | 6.58 |
| Comp. Ex. 17 | 28.69 | 4.37 | 1.77 | 7.55 | 57.62 | 7.63 |
| Comp. Ex. 18 | 28.69 | 2.87 | 1.27 | 8.62 | 58.55 | 6.79 |

TABLE 4

Weight Change Data in 90° C.

| Glass Example No. | Mole % | | | | 1 day WEIGHT CHANGE mg/cm² | 5 days WEIGHT CHANGE mg/cm² | 10 days WEIGHT CHANGE mg/cm² | 13 days WEIGHT CHANGE mg/cm² | Softening Temperature (° C.) | 85%/85° C. Exposure Durability |
|---|---|---|---|---|---|---|---|---|---|---|
| | $P_2O_5$ | $B_2O_3$ | $Al_2O_3$ | Sn/Zn | | | | | | Transmission Ranking |
| 5 | 26.5 | 2.8 | 1.4 | 11.66 | −0.05 | | | | | |
| 6 | 25.0 | 1.0 | 2.0 | 5.49 | | | | | | |

TABLE 4-continued

Weight Change Data in 90° C.

| | Mole % | | | | 1 day WEIGHT CHANGE mg/cm² | 5 days WEIGHT CHANGE mg/cm² | 10 days WEIGHT CHANGE mg/cm² | 13 days WEIGHT CHANGE mg/cm² | Softening Temperature (° C.) | Transmission | 85%/85° C. Exposure Durability Ranking |
|---|---|---|---|---|---|---|---|---|---|---|---|
| Glass | $P_2O_5$ | $B_2O_3$ | $Al_2O_3$ | Sn/Zn | | | | | | | |
| 7 | 25.5 | 2 | 1 | 5 | −0.057 | −0.154 | | −0.181 | 346 | Opal | 6 |
| 8 | 25.5 | 2 | 2 | 5.46 | −0.046 | −0.147 | | −0.169 | 349 | Opal | 6 |
| 9 | 25.5 | 3.5 | 1.5 | 5.47 | −0.051 | −0.134 | | −0.174 | 356 | Opal | 6 |
| 10 | 25.5 | 5 | 1 | 6.68 | −0.064 | −0.174 | −0.248 | | 354 | Opal | 6 |
| 11 | 25.5 | 5 | 1.5 | 7.12 | −0.093 | −0.159 | | −0.174 | 362 | Opal | 5 |
| 12 | 25.5 | 5 | 2 | 5 | −0.046 | −0.103 | | −0.120 | 366 | Opal | 6 |
| 13 | 25.5 | 5 | 1 | 6.68 | −0.049 | −0.195 | −0.314 | | 357 | Opal | 6 |
| 14 | 26.69 | 4.37 | 1.27 | 5.53 | −0.065 | −0.172 | | −0.214 | 361 | Opal | 6 |
| 15 | 26.69 | 2.87 | 1.27 | 5.51 | −0.081 | −0.236 | −0.357 | | 353/351 | Lt Opal | 6 |
| 16 | 27.87 | 3.75 | 1.54 | 6.17 | −0.046 | −0.144 | | −0.195 | 366 | Clear | 6 |
| 16a | 27.87 | 3.75 | 1.54 | 6.17 | −0.066 | −0.190 | | −0.255 | 363 | Clear | 5 |
| 17 | 28 | 3.83 | 2 | 6.26 | −0.076 | −0.231 | −0.342 | | 367 | Clear | 6 |
| 18 | 28.5 | 1.5 | 1.5 | 10.23 | | | | | | | |
| 19 | 28.5 | 3.0 | 1.5 | 10.17 | | | | | | | |
| 20 | 26.5 | 2.5 | 1.5 | 10.03 | | | | | | | |
| Comparative Example No. | | | | | | | | | | | |
| 1 | 28.5 | 1 | 0.5 | 9.9 | −0.155 | −31.010 | | | 327 | Clear | 1 |
| 5 | 29.5 | 2 | 1 | 5 | −0.228 | −0.377 | | −6.317 | 354 | Clear | 1 |
| 6 | 29.5 | 2 | 1 | 6.04 | −0.174 | −3.446 | | −46.992 | 347 | Clear | 1 |
| 7 | 29.5 | 3.5 | 1 | 5 | −0.156 | 0.985 | | −23.764 | 367 | Clear | 1 |
| 8 | 29.5 | 5 | 1 | 5 | −0.496 | −9.689 | | | 376 | Clear | 1 |
| 9 | 29.5 | 5 | 1 | 10.00 | −0.484 −0.333 | −51.690 −59.033 | | | 367 | Clear | 1 |
| 10 | 29.5 | 5 | 1.5 | 5 | −0.553 | −11.034 | −46.201 | | 378/375 | Clear | 1 |
| 11 | 29.5 | 5 | 2 | 5 | −0.089 | −0.593 | −2.364 | | 383 | Clear | 1 |
| 12 | 29.5 | 2 | 2 | 5 | −0.098 | −0.313 | −.566 | | 357/361 | Clear | 3 |
| 13 | 29.5 | 2 | 2 | 6.39 | −0.126 | −0.382 | | −0.819 | 357 | Clear | 3 |
| 14 | 29.5 | 2.96 | 2 | 10 | −0.101 −0.110 | −0.353 −0.314 | | −1.080 −0.612 | 358 | Clear | 2 |
| 14a | 29.5 | 2.96 | 2 | 10 | −0.068 −0.083 | −0.727 −02.66 | −0.484 | −1.877 | 356/361 | Clear | 3.5 |
| 15 | 29.5 | 3.5 | 2 | 5 | −0.076 | −0.295 | | −1.109 | 373 | Clear | 1 |
| 16 | 29.5 | 3.74 | 1.58 | 6.58 | −0.114 | −1.448 | | | 364 | Clear | 1 |
| 17 | 28.69 | 4.37 | 1.77 | 7.63 | −0.080 | −2.080 | −15.230 | | 365 | | 1 |
| 18 | 28.69 | 2.87 | 1.27 | 6.79 | −0.069 | −0.222 | −0.369 | | 356/359 | Clear | 2 |

TABLE 5

CONCENTRATION OF ELEMENTS IN WATER

| | Concentration (ppb) in water after 1 day at 90° C. | | | | | | Concentration (ppb) in water after 5 days at 90° C. | | | | | |
|---|---|---|---|---|---|---|---|---|---|---|---|---|
| | B | Al | P | Zn | Sn | Total ppb | B | Al | P | Zn | Sn | Total ppb |
| Example No. | | | | | | | | | | | | |
| 7 | 14 | 2 | 395 | 212 | 970 | 1593 | 228 | 2 | 1034 | 570 | 1480 | 3314 |
| 8 | 20 | 2 | 401 | 194 | 1000 | 1617 | 345 | 1 | 925 | 474 | 989 | 2734 |
| 9 | 27 | 3 | 470 | 230 | 1040 | 1770 | 78 | 5 | 1055 | 525 | 1040 | 2703 |
| 10 | 27 | 2 | 430 | 175 | 836 | 1470 | | | | | | |
| 11 | 40 | 2 | 439 | 172 | 1160 | 1813 | 72 | 2 | 760 | 293 | 545 | 1672 |
| 12 | 38 | 2 | 384 | 203 | 870 | 1497 | 165 | 1 | 820 | 395 | 550 | 1931 |
| 13 | 38 | 2 | 485 | 202 | 960 | 1687 | | | | | | |
| 14 | 39 | 2 | 482 | 220 | 1185 | 1928 | 300 | 3 | 1325 | 610 | 1650 | 3888 |
| 15 | 22 | 4 | 549 | 257 | 1153 | 1985 | | | | | | |
| 16 | 39 | 6 | 686 | 275 | 1900 | 2906 | 123 | 6 | 1250 | 520 | 2070 | 3969 |
| 16a | 26 | 3 | 462 | 177 | 1200 | 1868 | 62 | 6 | 1202 | 420 | 1770 | 3460 |
| 18 | 30 | 6 | 623 | 238 | 1430 | 2327 | | | | | | |
| Comp. Ex. | | | | | | | | | | | | |
| 5 | 57 | 25 | 2126 | 945 | 5780 | 8933 | 124 | 31 | 3710 | 1870 | 6720 | 12455 |
| 6 | 41 | 18 | 1513 | 560 | 3960 | 6092 | 6620 | 170 | 66720 | 40750 | 10200 | 124460 |
| 7 | 73 | 11 | 1320 | 590 | 2770 | 4764 | 605 | 40 | 6440 | 3330 | 8950 | 19365 |
| 8 | 694 | 22 | 3843 | 1285 | 3100 | 8944 | 26640 | 140 | 123960 | 81980 | 9975 | 242695 |
| 9 | 604 | 20 | 3475 | 690 | 3100 | 7889 | 87900 | 490 | 382700 | 207200 | 7700 | 685990 |

TABLE 5-continued

CONCENTRATION OF ELEMENTS IN WATER

| | Concentration (ppb) in water after 1 day at 90° C. | | | | | | Concentration (ppb) in water after 5 days at 90° C. | | | | | |
|---|---|---|---|---|---|---|---|---|---|---|---|---|
| | B | Al | P | Zn | Sn | Total ppb | B | Al | P | Zn | Sn | Total ppb |
| 10 | 507 | 21 | 2702 | 904 | 2610 | 6744 | | | | | | |
| 11 | 41 | 7 | 628 | 258 | 1170 | 2104 | | | | | | |
| 12 | 24 | 12 | 853 | 365 | 1720 | 2974 | | | | | | |
| 13 | 27 | 14 | 894 | 325 | 2060 | 3320 | 73 | 33 | 2525 | 965 | 4725 | 8321 |
| 14 | 43 | 16 | 1027 | 265 | 3010 | 4361 | 88 | 32 | 2150 | 575 | 4700 | 7545 |
| 14a | 23 | 8 | 588 | 145 | 1370 | 2134 | | | | | | |
| 15 | 39 | 7 | 725 | 323 | 1390 | 2484 | 171 | 32 | 2685 | 1230 | 4540 | 8658 |
| 16 | 55 | 11 | 889 | 315 | 1860 | 3130 | 3130 | 105 | 19255 | 8400 | 7935 | 38825 |
| 17 | 34 | 6 | 623 | 204 | 1372 | 2239 | | | | | | |
| 18 | 19 | 6 | 674 | 240 | 1490 | 2429 | | | | | | |

TABLE 6

WEIGHT CHANGE IN 90° C. WATER mg/cm$^2$

| Example No. | | 7 Days | 14 Days |
|---|---|---|---|
| 8 | Sample 1 | −0.41 | |
| | Sample 2 | −0.18 | |
| | Sample 3 | −0.09 | |
| | Sample 4 | −0.18 | |
| | Sample 5 | −0.37 | −0.60 |
| | Sample 6 | −0.36 | −0.55 |
| | Sample 7 | −0.36 | −0.48 |
| 6 | Sample 1 | −0.09 | |
| | Sample 2 | −0.19 | |
| | Sample 3 | −0.32 | |
| | Sample 4 | −0.18 | |
| 17 | Sample 1 | −0.28 | −0.39 |
| | Sample 2 | −0.47 | −0.74 |
| 14 | Sample 1 | −0.44 | −0.57 |
| | Sample 2 | −0.52 | −0.74 |
| | Sample 3 | −0.34 | −0.56 |
| 5 | Sample 1 | −0.75 | −1.19 |
| | Sample 2 | −0.29 | −0.47 |
| | Sample 3 | −0.95 | −1.72 |
| | Sample 4 | −0.32 | −0.65 |
| | Sample 5 | −0.43 | −0.61 |

We claim:

1. A lead-free sub-pyrophoshate SnO—ZnO—P$_2$O$_5$ glass composition, in mole percent on an oxide basis, consisting essentially of about: 24.5–29.0% P$_2$O$_5$; 1–5% B$_2$O$_3$; 1–2% Al$_2$O$_3$, 0–2% SiO$_2$, 51.5–66.5% SnO, 5–12% ZnO, wherein the mole ratio of SnO:ZnO is in the range of about 5:1 to 12:1, and under NMR spectroscopic analysis of $^{11}$B nuclei, the glass composition exhibits a profile having a peak centered at about −10 ppm (BO$_3$), and at least two peaks in the range of about −15 ppm to about −30 ppm.

2. The sub-pyrophosphate glass composition according to claim 1, wherein said profile has at least two peaks in the range of about −18 ppm to about −25 ppm.

3. The sub-pyrophosphate glass composition according to claim 2, wherein said profile has two peaks centered respectively at about −20 ppm and about −23 ppm.

4. The sub-pyrophosphate glass composition according to claim 1, wherein said glass exhibits enhanced stability and resistance to aqueous attack in environments of high temperature or humidity.

5. The sub-pyrophosphate glass composition according to claim 4, wherein said glass does not change in weight by more than 3 mg/cm$^2$ after 13 days of exposure to aqueous conditions at 90° C.

6. The sub-pyrophosphate glass composition according to claim 1, wherein P$_2$O$_5$ is present in the range of 25.5 to 28.5 mole %.

7. The sub-pyrophosphate glass composition according to claim 1, wherein B$_2$O$_3$ is present in the range of 1.5 to 4.8 mole %.

TABLE 9

| | Center Wavelength Shift (nm) | | | | | | | | | | | | |
|---|---|---|---|---|---|---|---|---|---|---|---|---|---|
| Aging Time (hrs) in 85%/85° C. Environs | Blend A - Example 6 + 35 wt % Filler ([Co, Mg]$_2$P$_2$O$_7$) | | | | | Blend B - Example 8 + 35 wt % Filler | | | | Blend C - Example 5 + 35 wt % Filler | | | |
| | Sample 1 | Sample 2 | Sample 3 | Sample 4 | Sample 5 | Sample 1 | Sample 2 | Sample 3 | Sample 4 | Sample 1 | Sample 2 | Sample 3 | Sample 4 |
| 192 | −0.131 | −0.074 | −0.063 | −0.066 | −0.043 | −0.032 | −0.024 | −0.041 | −0.047 | −0.017 | −0.002 | −0.005 | −0.01 |
| 480 | −0.151 | −0.086 | −0.074 | −0.078 | −0.059 | −0.041 | −0.034 | −0.051 | −0.049 | −0.016 | −0.001 | −0.002 | −0.007 |
| 792 | −0.163 | −0.097 | −0.085 | −0.092 | −0.08 | −0.046 | −0.043 | −0.064 | −0.057 | 0.011 | 0.018 | 0.004 | −0.01 |
| 1104 | | −0.103 | −0.08 | −0.088 | −0.074 | −0.05 | −0.043 | −0.063 | −0.059 | 0.015 | 0.021 | 0.005 | −0.001 |
| 1800 | | | | | | −0.053 | −0.047 | −0.071 | −0.059 | 0.012 | 0.016 | −0.031 | 0.004 |
| 1944 | | | | | | | | | | 0.029 | 0.024 | −0.085 | −0.001 |
| 2328 | | | | | | | | | | 0.027 | 0.023 | −0.101 | −0.066 |

8. The sub-pyrophosphate glass composition according to claim 1, wherein $B_2O_3$ is present in the range of 2 to 4.5 mole %.

9. The sub-pyrophosphate glass composition according to claim 1, wherein the glass exhibits a coefficient of thermal expansion of $90$–$110 \times 10^{-7}/°$ C.

10. The sub-pyrophosphate glass composition according to claims 1, wherein the glass exhibits a coefficient of thermal expansion of $-10 \times 10^{-7}/°$ C. to $10 \times 10^{-7}/°$ C. when a filler is added.

11. A sealing material containing a lead-free sub-pyrophosphate $SnO$—$ZnO$—$P_2O_5$ glass frit, the glass frit having a composition, in mole percent on an oxide basis, consists essentially of about: 25 to 28.5% $P_2O_5$; 2 to 5% $B_2O_3$; 1 to 2% $Al_2O_3$; 0 to 1% $SiO_2$; and an amount of SnO and ZnO respectively, wherein the molar ratio of SnO:ZnO ranges from 5:1 to 12:1, and under NMR spectroscopic analysis of $^{11}B$ nuclei, a profile with a peak centered at approximately $-10$ ppm and at least two peaks in the range of approximately $-18$ to $-25$.

12. The sealing material according to claim 11, wherein the composition exhibits a profile with at least two peaks centered respectively at approximately $-20$ and $-23$ ppm.

13. The sealing material according to claim 11, wherein said amount of SnO present in the composition is in the range of 51.5 to 66.5 mole %, and said amount of ZnO present is in the range of 5 to 12 mole %.

14. The sealing material according to claim 11, wherein $P_2O_5$ present in the composition is in the range of 25.5 to 28.5 mole %.

15. The sealing material according to claim 11, wherein the amount of $B_2O_3$ in composition is in the range of 2 to 4.8 mole %.

16. The sealing material according to claim 11, wherein said $B_2O_3$ and $P_2O_5$ are present in amounts that satisfy a condition of $B_2O_3/P_2O_5 < 0.20$ by mole ratio.

17. A lead-free sub-pyrophoshate $SnO$—$ZnO$—$P_2O_5$ glass composition, in mole percent on an oxide basis, consisting essentially of about: 24.5–28.5% $P_2O_5$; 2–5% $B_2O_3$; 1–2% $Al_2O_3$, 0–2% $SiO_2$, 51.5–66.5% SnO, 5–12% ZnO, such that the mole ratio of SnO:ZnO is in the range of about 5:1 to 12:1, and under NMR spectroscopic analysis of $^{11}B$ nuclei, the glass composition exhibits a spectroscopic profile having at least a peak centered at about $-10$ ppm ($BO_3$), and two distinct peaks in the range of about $-18$ ppm to about $-25$ ppm.

18. The sub-pyrophosphate glass composition according to claim 17, wherein said profile has two distinct peaks centered respectively at about $-20$ ppm and about $-23$ ppm.

19. The sub-pyrophosphate glass composition according to claim 17, wherein $P_2O_5$ is present in the range of 25.5 to 28.0 mole %.

20. The sub-pyrophosphate glass composition according to claim 17, wherein $B_2O_3$ is present in the range of 2 to 4.5 mole %.

21. The sub-pyrophosphate glass composition according to claim 17, wherein the glass exhibits a coefficient of thermal expansion of $90 \times 11 \times 110^{-7}/°$ C.

22. The sub-pyrophosphate glass composition according to claim 17, wherein the glass exhibits a coefficient of thermal expansion of $-10 \times 10^{-7}/°$ C. to $10 \times 10^{-7}/°$ C. when a filler is added.

* * * * *